July 31, 1928.
H. S. JOHNS
MEAT TENDERER
Filed May 12, 1926
1,678,699
4 Sheets-Sheet 4
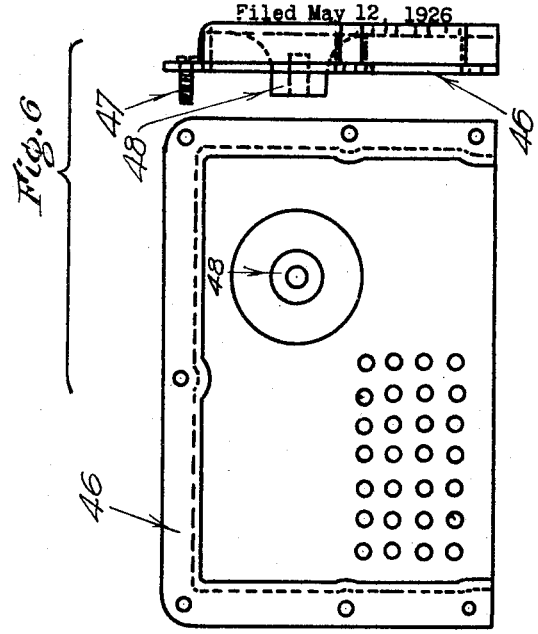
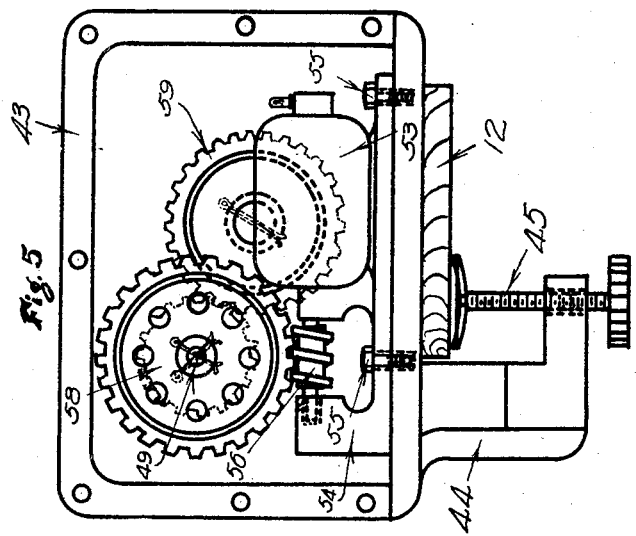
Inventor
Herman S. Johns.
By Edward H. Yeager
Attorney Patented July 31, 1928.

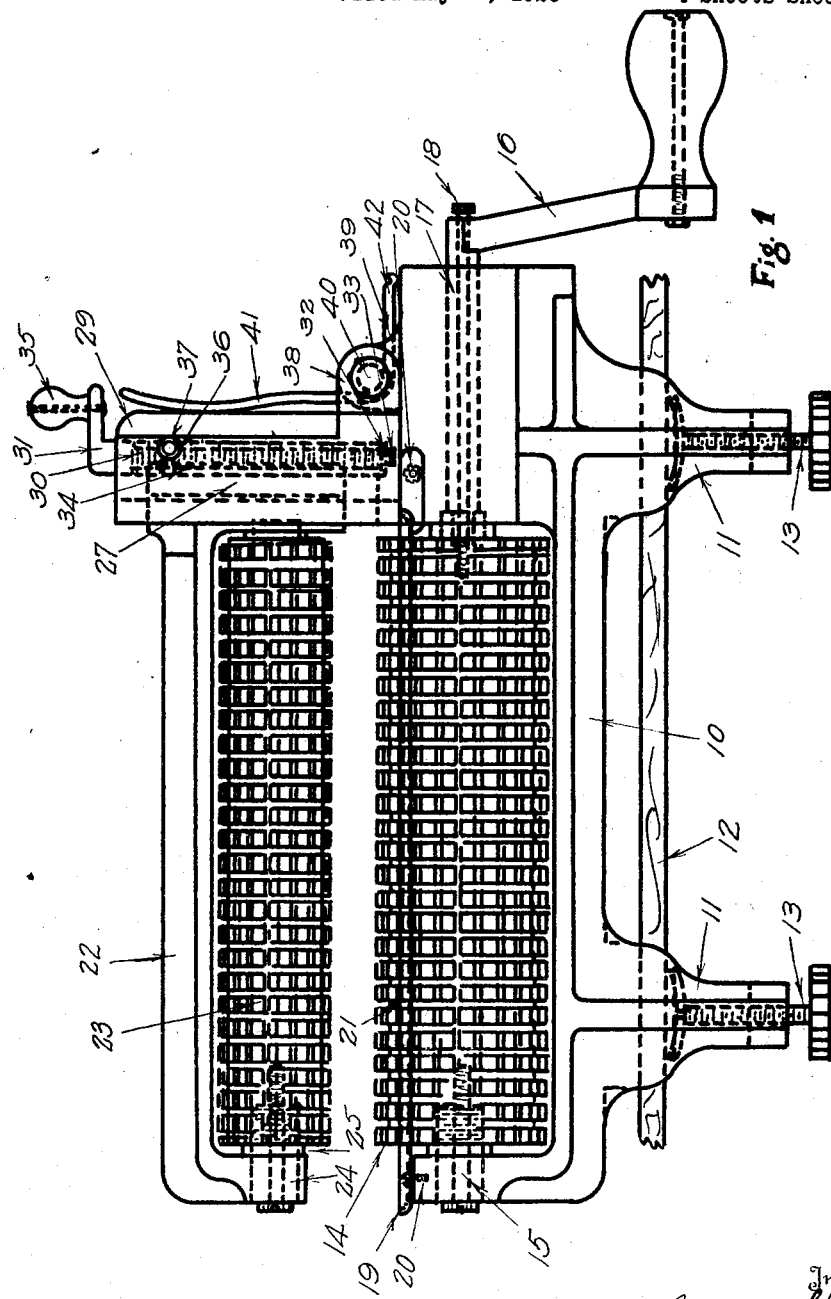

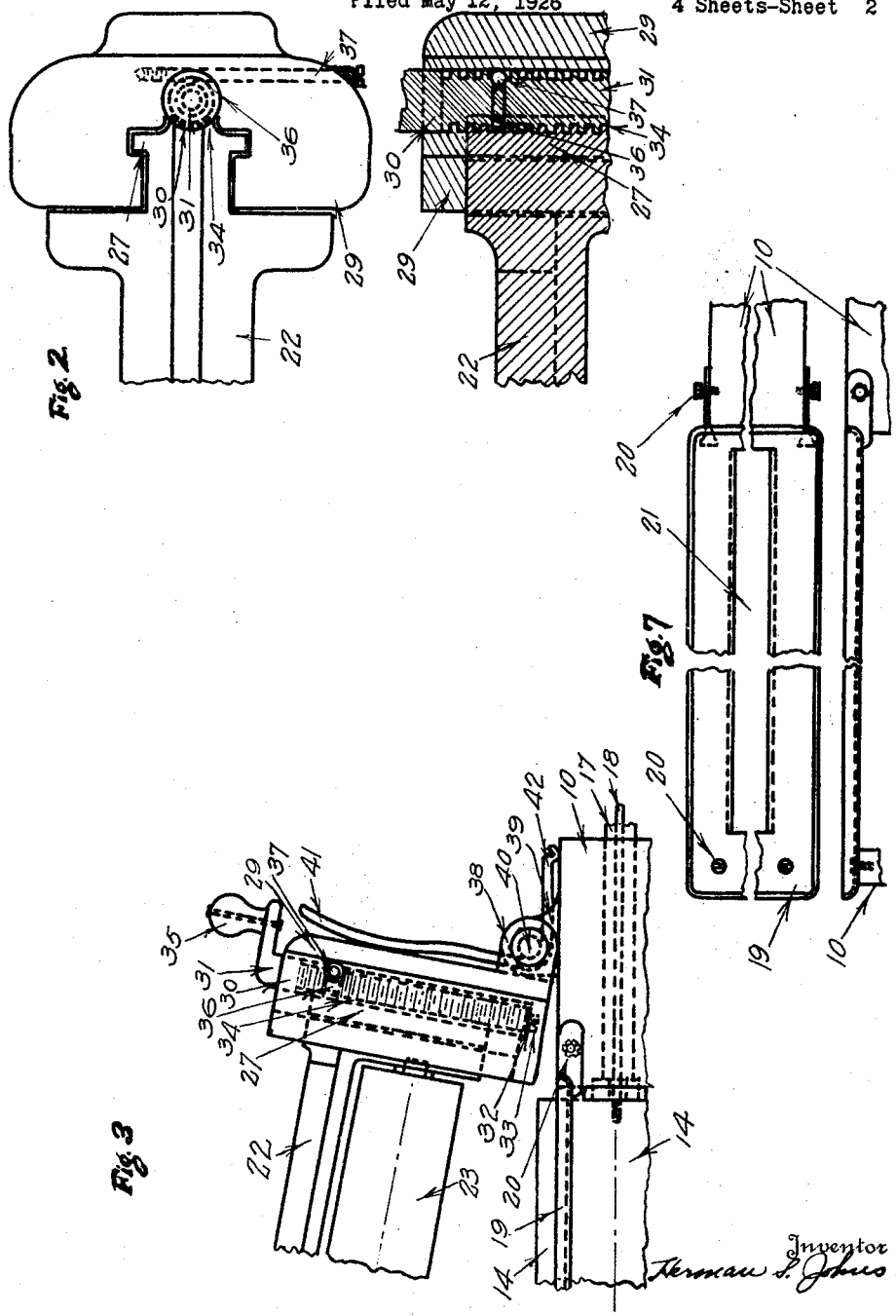

1,678,699

UNITED STATES PATENT OFFICE.

HERMAN S. JOHNS, OF ADA, OKLAHOMA.

MEAT TENDERER.

Application filed May 12, 1926. Serial No. 108,544.

This invention relates to steak tenderers, and contemplates the provision of a machine of novel construction, which can be conveniently and expeditiously operated for the purpose intended.

In carrying out the invention I contemplate the use of a pair of spaced rollers between which the steak or the like is adapted to be arranged, while the rollers are designed to operate against the steak with a sort of chopping or beating effect, with a view of making the steak tender.

One of the chief objects of the invention resides in the provision of means whereby one of said rollers can be quickly and conveniently adjusted toward and away from the other roller, so as to vary the space between the rollers as the occasion may require.

Another important object of the invention resides in the fact that the adjustable roller is also mounted for yielding movements to prevent clogging of the machine by any hard substance passing between the rollers, such as a bone in the meat or the like, the yieldable means being further utilized to normally maintain the movable roller pressed tightly against the meat arranged between the rollers.

A further object of the invention resides in the provision of motor actuated means for rotating one of said rollers, the circuit for the motor including an automatically operable switch to break the circuit and stop the machine should the latter become clogged to an extent that breakage of the machine might be otherwise possible, the switch being actuated by the yielding movements of the movable roller above referred to.

A still further object of the invention resides in a switch structure susceptible of adjustment, so that the machine can be regulated to be automatically stopped with different degrees of movement of the adjustable roller.

Other objects and advantages will appear from the following detail description, when read in connection with the accompanying drawings, the invention residing in the construction, combination and arrangement of parts as claimed.

In the drawings forming part of this application like numerals of reference indicate similar parts in the several views and wherein:

Figure 1 is a side elevation of the machine constructed in accordance with one embodiment of the invention, the rollers being shown in elevation and the frame supporting structure in section.

Figure 2 is a sectional view taken on line 2—2 of Figure 1.

Figure 3 is a fragmentary view showing the upper roller slightly elevated against the tension of the yieldable means associated therewith.

Figure 5 is an end view of the motor attachment with the end plate removed from the casing thereof.

Figure 6 is a side view and an elevation of the end plate.

Figure 7 is a fragmentary plan view of the slotted tray.

Figure 4:
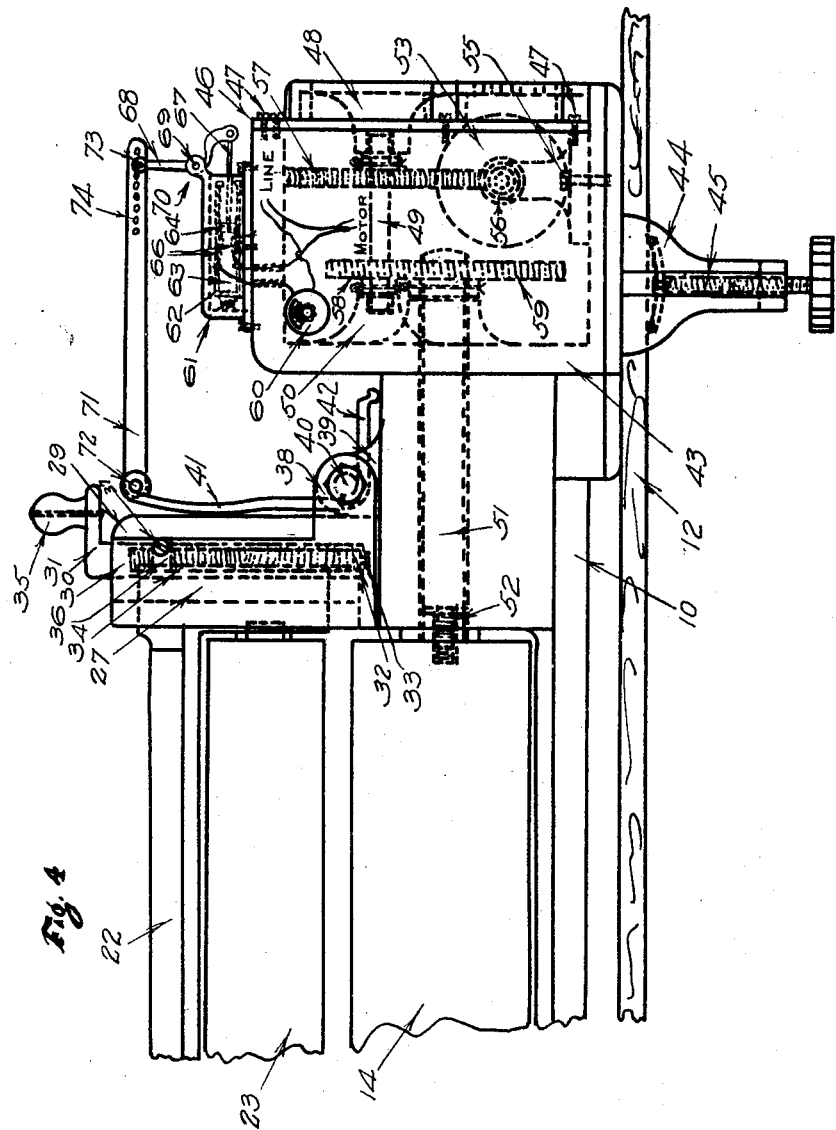
Figure 4 is a fragmentary view of a modified construction showing the location of the motor operated mechanism and the automatic operable switch.

The machine forming the subject matter of the present invention may be constructed from any suitable material, and may also vary in size without departing from the spirit of the invention.

The machine embodies a sectional frame-like structure, with the sections arranged in superimposed relation. The lowermost section is indicated at 10 and is provided with spaced clamps 11 of usual construction, and designed to embrace the edge of a work bench or other suitable support indicated at 12, each clamp having associated therewith a clamping screw 13. This section of the frame has mounted thereon a roller 14, the bearings for which are indicated at 15 and associated with the frame section in a manner to permit of their removal, when it is desired to separate the roller 14 from said section. While this roller can be rotated in any suitable manner without departing from the inventive idea, I preferably make use of a crank handle in accordance with the invention disclosed in Figure 1. The crank handle is indicated generally at 16, while the shank 17 thereof is passed through a longitudinal bore in one end of the frame section 10. The shank is circular in cross section throughout its entire length, except at the inner end thereof, which end is square to fit into a correspondingly shaped recess in the adjacent end of the roller 14 to prevent slipping of the shank as will be readily understood. This shank is also hollow to accommodate a bolt 18 which is passed through the shank and threaded into the adjacent end of the roller 14 to hold the crank handle operatively associated with the latter. Supported upon the frame section 10 is a tray 19 which is held attached to the frame by suitable fastening elements 20, this tray being slotted at at 21, through which the teeth of the roller operate.

The upper section of the frame is indicated at 22 and supports for rotation a roller 23 of the same construction as the lower roller 14. The roller 23 is preferably of less diameter than the roller 14, while both of said rollers are constructed to prevent corroding. The roller 23 is journaled in suitable bearings 24 which allows the roller to be readily and conveniently separated from the section 22 as the occasion may require. Located between one end of the section and the adjacent end of the roller is a washer 25, which when removed allows the roller 23 sufficient endwise movement to separate the roller entirely from its frame section. It might be stated that the rollers 14 and 23 respectively are provided with teeth 26, the edges and corners of which are rounded, in order to effect a beating or chopping action on the meat arranged between the rollers for the purpose intended; although it is to be understoood that the rollers can be designed in any suitable manner to advantageously carry this idea into effect. Manifestly when the meat is arranged between the rollers 14 and 23 respectively, the lower roller 14 is positively rotated, while rotation of the upper roller 23 is effected by the material or meat passing through the machine. The upper roller 23 is mounted for movement with relation to the roller 14, and yieldable means to be hereinafter described is employed for pressing the upper roller tightly against the meat passing through the machine.

It may be necessary to vary the space or distance between the respective rollers for different kinds of meat, and for this purpose I provide means whereby the upper roller can be adjusted toward and away from the roller 14. In the specific embodiment of the invention herein illustrated, one end of the frame section 22 is provided with a substantially T-shaped head 27 in cross section, which is slidably fitted in a correspondingly shaped slot 28 formed in a post or upright 29 normally reposing upon the adjacent end of the frame section 10. The post 29 is provided with a vertical bore 30 to receive a feed screw 31, the lower end of which is reduced as at 32 and received in a bearing or depression 33 in the bottom of the upright 29. The adjacent side of the T-shaped head 27 is also threaded as at 34 to cooperate with the threads of the feed screw 31, so that when the latter is rotated through the instrumentality of a suitable handle 35, the entire frame section 22 with its roller 23 is adjusted vertically with relation to the roller 14. Of course the roller 23 is moved toward or away from the roller 14, depending upon the direction of rotation of the feed screw 31. This screw is provided with an annular groove 36 which receives a transverse pin 37, by means of which the feed screw is held against vertical movement incident to its operation, thereby causing the frame section 22 to move vertically with relation to the feed screw.

In addition to this adjustment of the frame section 22, the latter and roller 23 are also capable of yielding pivotal movement, with a view of preventing the machine from becoming clogged from any cause whatsoever, but more particularly by large bones in the meat passing through the restricted space between the respective rollers. For this purpose the post or upright 29 is provided with apertured lugs 38 which are arranged adjacent similar lugs 39 rising from the frame section 10, all of said lugs receiving a pivot bolt 40, thus providing a pivotal connection between the frame section 10 and the frame section 22. Manifestly the post or upright 29 forms part of the frame section 22 for this purpose, although it remains stationary when the feed screw 31 is actuated to adjust the roller 23 toward or away from the roller 14. Any suitable means may be employed for exerting a downward pressure upon the frame section 22 for maintaining the roller 23 pressed tightly upon the meat passing through the machine, and at the same time afford the roller 23 and its supporting structure yielding movement to prevent clogging of the machine as above stated. However I preferably employ a leaf spring 41 which has a portion arranged about the pivot bolt 40, and its lower end 42 arranged at a right angle to the body portion 41, and reposing upon the frame section 10. Manifestly the body portion 41 of this spring is arranged vertically against the post or standard 29, and as above stated exerts a downward pressure against the entire frame section 22 and roller 23 for the purpose specified. However should a bone or other hard substance, of too great a size to pass between the rollers 14 and 23, be brought in contact with said rollers, the spring 41 allows the upper roller 23 and its supporting frame 22 to yield upwardly in the manner illustrated in Figure 3, and thus prevent clogging and possible breakage of some part of the machine.

It will be further noted that the machine is open at one end, or in other words the frame sections 10 and 22 respectively are suitably spaced apart for the purpose of chopping T-bone steak or the like, inasmuch as the bone may be moved up close to the rollers from this end of the machine, thereby allowing all of the meat to be chopped around the bone as will be readily understood.

In accordance with the invention disclosed in Figures 4 to 6 inclusive, the lower roller 14 is rotated by a motor operated mechanism, in contradistinction to the manually operable crank handle 16 disclosed in Figure 1. In this form of the invention a casing 43 is arranged at one end of the frame section 10, and formed with a suitable clamp 44 including a screw 45, by means of which the casing can be attached to a work bench or other support 12 in operative relation to the machine. The end plate 46 of this casing can be easily removed to permit access being had to the interior of the casing as the occasion may require, suitable fastening elements 47 maintaining the end plate in position. This end plate is provided with a bearing 48 to accommodate one end of the shaft 49, the other end being journaled in a bearing 50 carried by the opposed end wall of the casing as clearly illustrated in Figure 4. It might here be stated that the motor operated means may be used as an attachment with the machine illustrated and described in Figure 1, when use of such an attachment is desired. The only change necessary in order to use the motor attachment, resides in the removal of the crank handle 16 and its shank 17 from the frame section 10, and to arrange a shaft 51 in place of the shank 17 of said crank handle. This shaft 51 is clearly shown in Figure 4, and is provided with a threaded extension 52 adapted to be screwed into one end of the roller 14. The shaft 51 also projects into the casing 43 to be suitably geared with the motor in the manner to be presently described.

Arranged within the casing is a small electric motor 53 which includes a frame-like base 54 suitably secured to the bottom of the casing 43. Bolts 55 are preferably used for this purpose and clearly illustrated in Figure 5. The shaft of the motor carries a worm gear 56 journaled in the frame-like base 54 as clearly shown in Figure 5, and this worm meshes with a gear 57 arranged at a right angle to said worm and carried by the shaft 49 above referred to. This same shaft 49 carries a smaller gear 58 which meshes with a larger gear 59 carried by the adjacent end of the shaft 51, this shaft as above stated being connected with the roller 14. By reason of the construction above described it is obvious that when the end plate 46 of the casing is removed, the shaft 49 together with its two gears 57 and 58 respectively can also be conveniently removed from the casing for any purpose whatsoever. Included in the circuit with the motor 53 is any conventional form of switch 60, and when the switch is operated to close the circuit, the machine is put into operation. The shaft 49 is of course rotated from the motor shaft by the gears 56 and 57 respectively, while rotation is imparted from the shaft 49 to the shaft 51 by the associated gears 58 and 59 respectively.

When the motor attachment is used I employ an automatically operable switch, which closes the circuit and stops the machine in case of an emergency, such as, for instance, the machine becoming clogged in a manner that would probably break some part of the machine, or otherwise prove detrimental thereto. This automatic switch is so constructed and arranged that it depends upon the yielding movements of the upper roller 23 for its operation, the switch itself being susceptible of adjustment so as to require a greater or less degree of yielding movement of said roller to call the switch into use. The switch is operated from the spring 41 hereinabove described in connection with Figure 1, and bearing against the post or upright 29 for the purposes above stated.

The switch itself comprises a small casing 61, in which is pivoted a block 62 having a longitudinal bore 63 in which a movable contact 64 is arranged to reciprocate. This contact is in the nature of a small block of insulated material, two opposed sides of which are provided with metallic strips 65 which are adapted to cooperate with a pair of opposed stationary contacts 66 arranged longitudinally of the bore 63 in said block 62. The movable contact 64 is arranged at one end of a rod 67 which projects beyond one end of the casing 61 and is pivotally connected to a link 68, the latter being fulcrumed at a point between its ends as at 69 upon a corner extension 70 formed on the casing 61. The upper end of this link 68 is adjustably connected with the adjacent end of a horizontally disposed lever 71, the other end being suitably connected as at 72 with the adjacent end of the spring 41. While the link 68 may be adjustably connected with the lever 71 in various ways, I preferably provide the link with an opening 73, and the lever 71 with a series of longitudinal openings 74, so that the link 68 can be connected with any one of the openings 74 to require different degrees of movement of the lever 71 in order to operate the automatic switch. In other words the metallic plates 65 carried by the insulated block 64, normally engage the fixed contacts 66, so that the circuit to the motor is completed to operate the machine, when the switch 60 is turned on. However should the machine become clogged by an unduly large bone attempting to pass between the rollers, or from any other cause, tending to break the machine, the upper roller 23 together with its frame section will yield against the tension of the spring 41, assuming an inclined position as illustrated in Figure 3. Consequently when the spring 41 is flexed, it shifts the lever 71 in a direction to operate the link 68 to cause the reciprocatory block or movable contact 64 to move beyond the fixed contacts 66, and out of engagement therefrom, thereby automatically stopping the motor and the operation of the machine. This automatic switch therefore not only prevents breaking of the machine under the circumstances mentioned, but also prevents the motor from burning up, should the machine break under such conditions without the circuit being opened. I preferably connect the emergency switch in circuit with the motor so that there will be no current passing through the emergency switch until the switch 60 is actuated to close the circuit.

It will be further noted that the end wall 46 of the casing 43 is provided with a plurality of air openings for the purpose of preventing the motor from becoming overheated.

While it is believed that from the foregoing description the nature and advantages of the invention will be readily apparent, I desire to have it understood that I do not limit myself to anything herein shown, and that such changes may be resorted to when desired as fall within the scope of the invention as claimed.

What is claimed is:

1. In a machine of the character described, a pair of spaced parallel rollers, means supporting said rollers for rotation, means for rotating one of said rollers, means for adjusting the other roller toward and away from the first mentioned roller to vary the distance between said rollers, said supporting structure for the last mentioned roller being mounted for pivotal movement, and resilient means exerting a downward pressure on said structure and its roller, and permitting pivotal yielding movements at one end thereof for the purpose described.

2. In a machine of the character described, a sectional frame-like structure, rollers journaled in the respective sections of the frame and mounted in spaced superimposed relation, a standard rising from one section of the frame and having a central bore and a slot communicating therewith, an angular shaped head carried by the other section of the frame and slidable in said slot and bore, said head being threaded, a feed screw operable in said bore and cooperating with said head to adjust the second mentioned section of the frame and its roller toward and away from the other roller of said pair, and means for rotating the last mentioned roller.

3. In a machine of the character described, a sectional frame, rollers journaled in the respective sections of the frame, a standard mounted on one of said sections for pivotal movement and forming part of the other section, means associated with said standard whereby the last mentioned section can be adjusted toward and away from the first mentioned section independently of said standard to vary the distance between said rollers, and resilient means exerting a downward pressure on the standard and adjustable section, and permitting yielding pivotal movements thereof for the purpose described.

4. In a machine of the character described, a pair of spaced parallel rollers mounted for rotation, motor actuated means for rotating one of said rollers, an electric circuit including said motor, a manually operated switch arranged in said circuit, and an automatic operable switch included in the circuit and controlled by the movements of the motor actuated roller.

5. In a machine of the character described, a pair of spaced parallel rollers, motor actuated means for rotating one of said rollers, means for supporting the other roller for yielding movements toward and away from the first mentioned roller, an electric circuit including said motor, a manually operated switch arranged in the circuit, an emergency switch also included in the circuit, and means for automatically operating the emergency switch incident to the yielding movement of said roller.

6. In a machine of the character described, a pair of spaced parallel rollers mounted for rotation, motor actuated means for rotating one of said rollers, means supporting the other roller for yielding pivotal movement with relation to the first mentioned roller, an electric circuit including said motor, a manually operated switch arranged in said circuit, an emergency switch included in said circuit, means for automatically operating the emergency switch to break the circuit when the last mentioned roller is moved pivotally, and said operating means being adjustable, whereby the emergency switch can be operated with different degrees of yielding movement of said roller.

7. In a machine of the character described, a pair of spaced parallel rollers, means for supporting said rollers for rotation, means for rotating one of said rollers, the supporting means for the other roller being mounted for pivotal movement at one end of said roller, means for adjusting the last mentioned roller toward and away from the first mentioned roller to vary the distance between the rollers, and resilient means exerting a pressure against the supporting means for the second mentioned roller to permit of yielding pivotal movements thereof.

8. In a machine of the character described, a pair of spaced parallel rollers, means for adjusting one of said rollers toward and away from the other roller, means for supporting the adjustable roller for yielding movements, electric operated means for rotating one of said rollers, including a manually operable switch, and an emergency switch arranged to be automatically actuated when the said adjustable roller yields a predetermined distance in one direction.

9. In a machine of the character described, a pair of spaced grinding rollers, means for yieldably supporting one of the rollers with relation to the other, electric operated means for rotating one of said rollers, and an emergency switch included in circuit with said means and automatically actuated incident to the yielding movement of said roller in one direction for the purpose specified.

In testimony whereof I affix my signature.

HERMAN S. JOHNS.